(12) United States Patent
Belew et al.

(10) Patent No.: US 7,214,321 B2
(45) Date of Patent: May 8, 2007

(54) ADSORPTION METHOD AND LIGANDS

(75) Inventors: Makonnen Belew, Uppsala (SE);
Bo-Lennart Johansson, Uppsala (SE);
Jean-Luc Maloisel, Uppsala (SE)

(73) Assignee: GE Healthcare Bio-Sciences AB, Uppsala (SE)

( * ) Notice: Subject to any disclaimer, the term of this patent is extended or adjusted under 35 U.S.C. 154(b) by 473 days.

(21) Appl. No.: 10/312,054

(22) PCT Filed: Jul. 16, 2001

(86) PCT No.: PCT/EP01/08203

§ 371 (c)(1),
(2), (4) Date: Dec. 20, 2002

(87) PCT Pub. No.: WO02/05959

PCT Pub. Date: Jan. 24, 2002

(65) Prior Publication Data

US 2004/0256324 A1 Dec. 23, 2004

(30) Foreign Application Priority Data

Jul. 17, 2000 (SE) .................................... 0002688

(51) Int. Cl.
*B01D 15/04* (2006.01)
(52) U.S. Cl. ...................... 210/660; 210/681
(58) Field of Classification Search ................ 210/660, 210/681, 198.2, 656
See application file for complete search history.

(56) References Cited

U.S. PATENT DOCUMENTS 5,045,190 A * 9/1991 Carbonell et al. ....... 210/198.2

FOREIGN PATENT DOCUMENTS

| GB | 2 050 192 | 1/1981 |
|---|---|---|
| WO | WO98/08603 | 3/1998 |
| WO | WO99/65607 | 12/1999 |
| WO | WO01/38227 | 5/2001 |

OTHER PUBLICATIONS

Thoemmes Joerg, "Investigations on Protein Adsorption to Agarose-Dextran Composite Media" Biotechnology and Bioengineering vol. 62, No. 3, Feb. 5, 1999 pp. 358-362.

* cited by examiner

*Primary Examiner*—Robert Hopkins
(74) *Attorney, Agent, or Firm*—Yonggang Ji

(57) ABSTRACT

The invention relates to a method for removing a positively charged substance from an aqueous liquid (I) by contacting the liquid with a cation-exchanger (1), possibly followed by a subsequent desorption of said substance. The cation-exchanger is selected to be capable of (a) binding to said substance by cation-exchange in an aqueous liquid reference (II) at an ionic strength corresponding to 0.3 M NaCl and (b) permitting a break through capacity for said substance $^3$200%, such as $^3$300% or $^3$500%, of the break-through capacity of said substance for a reference cation-exchanger (2) containing sulphopropyl groups —$CH_2CH_2CH_2SO_2O$—. The cation exchange ligands have an at least bimodal function by comprising a cation exchanging group and a separate hydrogen-bonding atom. The invention also relates to a method for testing the appropriateness of a cation-exchanger for removing a substance from a liquid and novel cation exchangers.

5 Claims, No Drawings

ADSORPTION METHOD AND LIGANDS

TECHNICAL FIELD AND TECHNICAL BACKGROUND

This invention relates to new kinds of cation-exchangers that adsorb/bind substances at unusually high levels of ionic strengths. These cation-exchangers enable new ways for removing positively charged substances, for instance bioorganic substances, from liquids that preferably are aqueous.

Cation-exchangers comprise a plurality of ligands carrying a net negative charge. These kinds of ligands shall hereinafter be called "cation-exchange ligands". They include a possible spacer between the support matrix and the part of the ligand interacting with the substance to be bound. Cation-exchange ligands as contemplated in the context of the present invention typically have a molecular weight <1000, such as <700 daltons excluding the molecular weight contribution of halo groups that may be present.

The ligands are bound to a suitable carrier material, which typically is insoluble or insolubilizable in aqueous liquid media. Insoluble carrier materials will hereinafter be referred to as matrices and include also insolubilized forms or insolubilzable carrier materials.

The term "bimodal", in the context of this invention, refers to a ligand that is capable of providing at least two different, but co-operative, sites which interact with the substance to be bound. One of these sites gives an attractive type of charge-charge interaction between the ligand and the substance of interest. The second site gives hydrogen-bonding and/or hydrophobic interactions. Other kinds of interactions may also be present, for instance $\pi$—$\pi$, charger transfer and induced dipole interaction. There may also be present other sites giving rise to interactions with the ligand and the substance of interest.

The term remove/removal or separate/separation in the context of the present invention will encompass removal of a substance for any purpose, thus including adsorption to a cation-exchanger for isolation, purification, concentration, analysis etc. Removal/separation of impurities from a liquid will thus be included. In this case the liquid can be further processed with respect to some other substance(s) that is(are) of interest. The adsorbed substance may also be further processed. In this latter case the substance is typically de-sorbed and collected. If needed the substance is subjected to further purification steps. Good process economics requires that the cation-exchanger is regenerated and re-used after de-sorption.

Disadvantages With Earlier Techniques

Cation-exchange adsorption has for many years been of interest in large scale processing of fermentation broths and the like. These kinds of liquids typically have a high ionic strength making them unsuitable for direct application to conventional ion-exchangers. One reason has been that conventional ion exchangers adsorb proteins and other biopolymers only at moderate ionic strengths, for instance at 0.1 M or lower in NaCl. This has implied dilution of process liquids giving large volumes to process and heavy investments in process equipment.

Related Publications

WO 9965607 (Amersham Pharmacia Biotech AB) discloses cation-exchangers in which there are linear cation-exchange ligands —A—X—Y(—Z)$_n$ where n is an integer $\geq 1$, A is a spacer, X is —O—, —SR'— or —N(R')(R") (R' and R" are H, a free electron pair and certain groups providing a carbon directly attached to the heteroatom), Y is certain hydrocarbyl groups with the disclaimer that some of them shall not be combined with X being —O— or —S—, and finally Z is a cation-exchange group. The invention described in WO 9965607 is based on the discovery that in the defined group of ligands, there are cation-exchange ligands that, in contrast to conventional cation-exchangers, require elution ionic strengths that are up to 200% compared to a reference sulphopropyl cation-exchanger. It is speculated that there may be found extreme ligands that require ionic strengths more than 200% of the reference cation-exchanger.

WO 9808603 (Upfront Chromatography) discloses separation media of the general structure M-SP1-L in which M is a support matrix that may be hydrophilic, SP1 is a spacer and L comprises a mono- or bicyclic homoaromatic or heteroaromatic moiety that may be substituted (a homoaromatic moiety comprises an aromatic ring formed only by carbon atoms). In one variant L is X—A-SUB where X is —O—, —S— or —NH— and A is the homoaromatic or heteroaromatic moiety that is substituted. The substituent on A may be an acidic group which means that —SP1-X—A-SUB can be a cation-exchange ligand which is linear. The separation medium is suggested for the adsorption of proteins, in particular immunoglobulins, by hydrophobic interactions rather than cation-exchange (salt concentration up to 2 M).

WO 9600735 and WO 9609116 (Burton et al) disclose ion exchange resins in which the hydrophobicity/hydrophilicity of the resin including the ligand is changed upon changing in pH. The hydrophobicity may also be increased synthetically by the introduction of hydrophobic non-ionizable ligands. Adsorption/desorption is controlled by altering the hydrophobicity/hydrophilicity of the matrix including the ligand, for instance by changing the pH.

U.S. Pat. No. 5,789,578 (Burton et al) suggests to immobilise a thiol containing ligand, such as 3-mercaptopropionic acid, by addition of the thiol group over carbon-carbon double bond attached to a support matrix. The inventors in this case neither employ nor suggest the use of the material obtained for cation-exchange adsorptions.

WO 9729825 (Amersham Pharmacia Biotech AB) discloses anion exchangers in which the anion exchanging ligands comprises oxygen and/or nitrogens at a distance of 2–3 carbon atoms from the nitrogen atom of a primary, secondary or tertiary ammonium group (positively charged, cationic).

Dipolar adsorbents prepared by coupling of sulphanilic acid using epichlorohydrin has been described (ligand+spacer=—CH$_2$CHOHCH$_2$N$^+$H$_2$C$_6$H$_4$SO$_3^-$) (Porat et al., J. Chromatog. 51 (1970) 479–489; and Ohkubo et al., J. Chromatog. A, 779 (1997), 113–122). The articles do not disclose a method in which the ligand is negatively charged and the substance to be removed is positively charged.

2,4,6-trihalo-1,3,5-triazine has been utilized to bind different compounds RHNR'X to carriers inter alia to cellulose. R has been hydrogen, aryl or alkyl, R' alkylene or arylene and X carboxy, sulphonyl, phosphate, phosphonate, boronate, etc. (See Behrend et al., WPI Abstract Accession No. 86-312313 (=DD-A-237844). This coupling methodology gives structures that are unstable to hydrolysis.

EP 326233 discloses a cation-exchanger in which there is a hydrophobic support matrix to which cation exchanging groups are attached. The hydrophobicity makes this type of cation-exchangers unsuitable for separation of biomolecules such as proteins.

OBJECTIVES OF THE INVENTION

The objectives of the present invention are to achieve
a) adsorption/binding of positively charged compounds, such as proteins, to cation-exchangers at higher ionic strengths;
b) elution/desorption of the adsorbed/bound compound at high ionic strengths and/or within broad ionic strength intervals;
c) cation-exchangers which have high breakthrough capacities, good recovery of proteins (many times up to 95% of the applied amount of the protein of interest) etc;
d) a lowering the need for extensive dilutions when samples of high ionic strength are to be processed on cation-exchangers and to accomplish simplified desalting procedures;
e) a method for discovering cation-exchangers/cation-exchange ligands that, when bound to a support matrix, adsorb a positively charged substance with a breakthrough capacity that is at least of the same order of magnitude as obtained for the same substance with a reference cation-exchanger; etc The comparison is relative to what is conventional in the field.

In the formulas given below relating to certain groups (not the cation-exchange ligands as such), there are open bonds and R-groups. Open bonds refer to binding to carbons, typically $sp^3$-hybridised or aromatic carbons. R refers to lower hydrocarbyls ($C_{1-10}$) and/or corresponding acyls, both of which often have hydrophilic substituents, such as hydroxy. The hydrogens (H) contemplate that the hydrogen may be replaced with a lower hydrocarbyl or corresponding acyls as just defined.

The Invention

We have now surprisingly discovered that there are a number of cation exchanging ligands giving cation-exchangers having one or more of the properties represented by objective (c) above, if one properly screens for these properties. (See the experimental part).

A first aspect of the invention is a method for removing a positively charged substance, typically a bio-organic substance from an aqueous liquid (I) containing said substance. The method comprises:
(i) contacting the liquid (I) with a cation-exchanger (1) under conditions leading to binding of said substance to said cation-exchange ligands by cation-exchange, and
(ii) possibly followed by a subsequent de-sorption of said substance.

The method is characterized in that the cation-exchanger (1) used is capable of
(a) binding to said substance by cation-exchange in an aqueous reference liquid (II) at an ionic strength corresponding to 0.3 M NaCl and,
(b) permitting a break through capacity for the substance $\geq 200\%$, such as $\geq 300\%$ or $\geq 500\%$ or $\geq 1000\%$, of the break through capacity of the substance for a reference cation-exchanger (2) containing sulphopropyl groups —$CH_2CH_2CH_2SO_3^-$.

The cation-exchanger (1) and the reference cation-exchanger have essentially the same degree of substitution (measured as total ion exchange capacity) and essentially the same support matrix (support material, bead size, pore sizes, pore volume, packing procedure etc). The running conditions are essentially the same [break through (for instance Qb=10%), conditions in the liquid such as pH, salt concentration and kind of salt, non-compound A constituents etc]. The pH for the comparison is selected at a pH at which the substance has a net positive charge and each of the cation-exchanger (1) and (2) have a net negative charge. The spacer and coupling chemistry may differ. Certain kinds of coupling chemistries may lead to cross-linking of a starting support matrix resulting in a more rigid matrix. In this case the flow conditions at which the comparison is made is of course selected at a level where the matrix is essentially non-compressed.

Suitable cation-exchange ligands may be selected as outlined in the fifth aspect of the invention (see below).

The cation-exchanger (1) used typically comprises a plurality of cation-exchange ligands which are firmly attached to a support matrix, often covalently and typically via some kind of spacer. The term firmly attached means that the ligands shall not get off to any significant degree during the adsorption/desorption step applied.

According to a first part of the first aspect of the inventive, the cation-exchange ligands are branched and have a bimodal function as defined above.

One branch (1) thus comprises a cation-exchange group selected among sulphonate (—$SO_3^-$/—$SO_3H$), sulphate (—$OSO_3^-$/—$OSO_3H$), carboxylate (—$COO^-$/—$COOH$), phosphate (—$OPO_3^{2-}$/—$OPO_3H^-$/—$OPO_3H_2$ and phosphonate (—$PO_3^{2-}$/—$PO_3H^-$/—$PO_3H_2$). The preference is for so called weak cation-exchangers, i.e. cation-exchangers that have a pKa that is above 3. Typical examples are carboxylate (—$COO^-$/—$COOH$), phosphate (—$OPO_3^{2-}$/—$OPO_3H^-$/—$OPO_3H_2$ and phosphonate (—$PO_3^{2-}$/—$PO_3H^-$/—$PO_3H_2$). This preference applies also to various other aspects of the invention.

A second branch (2) comprises a functional group containing at least one hydrogen-bonding atom which is located at a distance of 1–7 atoms from the cation exchanging group of branch (1). The hydrogen-bonding atom is selected among heteroatoms, such as oxygens (carbonyl oxygen, ether oxygen, hydoxy oxygen, sulphone oxygen, sulphone amide oxygen, sulfoxide oxygen, oxygen in aromatic rings etc), nitrogens (amide nitrogen, nitrogen in aromatic rings etc), sulphurs (thioether sulphur, sulphur in aromatic rings etc); and sp- and $sp^2$-hybridised carbons; and halo groups, such as fluoro, chloro, bromo or iodo with preference for fluoro. Branch (2) typically contains no charged atom or atom that is chargeable by a pH change. Branch (1) may, in addition to the cation-exchange group, also contain one or more hydrogen-bonding atoms which are located at a distance of 1–7 atoms from the cation-exchange group.

A hydrogen-bonding atom is an atom that is capable of participating in hydrogen bonds (except hydrogen). See Karger et al., An Introduction into Separation Science, John Wiley & Sons (1973) page 42.

sp- and $sp^2$-hybridised carbons may participate in hydrophobic interactions as well as in hydrogen-bonding.

Branched cation-exchange ligands of the above-mentioned type may be depicted as:

where
(a) X is a cation-exchange group selected among sulphonate (—$SO_3^-$/—$SO_3H$), sulphate (—$OSO_3^-$/—$OSO_3H$), carboxylate (—$COO^-$/—$COOH$), phosphate (—$OPO_3^{2-}$/—$OPO_3H^-$/—$OPO_3H_2$ and phosphonate (—$PO_3^{2-}$/—$PO_3^-H$/—$PO_3H_2$).
(b) A represents an organic group comprising an organic chain (A') stretching from X to the support matrix, with the provision that, if there is a cation-exchange group (X') in the A group, then the chain from such a cation-exchange group (X') is always shorter than, or of the same length as, A';

(c) HB is a group containing at least one carbon atom plus at least one hydrogen-bonding atom which is located at a distance of 1–7 atoms from the cation-exchange group (X);

A' thus contains the chain of the cation-exchange ligand, which connects X to the support matrix. A may further contain cation exchanging groups (X') possibly linked by a respective bivalent organic bridge to the organic chain A'. X' and X may be different or equal. Organic bridges of this kind may or may not contain hydrogen-bonding atoms as discussed above. In an analogous fashion, there may also be additional branches (HB') providing hydrogen-bonding atoms which are located at a distance of 1–7 atoms from a cation-exchange group as discussed above. HB and HB' may be different or equal.

In case there are parts of A' that belong to a ring structure, there will be more than one alternative for A'. By definition the path through the ring containing the largest number of substituted ring-atoms is considered to be part of A'. The remaining path(s) do not define branches, unless they carry a substituent, such as a group containing a hydrogen-bonding atom (for instance an HB group), or contains a hydrogen-bonding heteroatom.

HB and HB' groups are located at a distance of 1–7 atoms from the cation-exchange group X, with preference for 1, 2, 3 and 4.

The hydrogen-bonding atom defined above may be present in the A' part of A in either of two forms:
(a) as part of the chain A', or
(b) as an atom bound to an atom in A' and projecting from the chain.

Typical hydrogen-bonding atoms of type (a) are selected among heteroatoms, such as ether and ester oxygens (—O— and —CO—O—), thioether sulphur (—S—) and amide nitrogens [such as in carboxamides (—CO—NH— and —N(COR)—) and sulphone amides (—SO$_2$NH—, —N(SO$_2$R)—], and sp- and sp$^2$-hybridised carbons. The open bonds bind to carbons. R is typically a lower hydrocarbyl, for instance C$_{1-10}$.

Hydrogen-bonding atoms of type (a) also includes heteroatoms in aromatic rings (sulphur, nitrogen or oxygen). Illustrative examples of heteroaromatic rings are thiophene, furan and pyridine.

Typical hydrogen-bonding atoms of type (b) are selected among:
(i) oxygens in
(i.1) —CO—, —SO—, —SO$_2$— or —SO$_2$NH— where the carbon, sulphur and nitrogen are part of A';
(i.2) alcoholic or phenolic hydroxyls that are directly attached to a carbon which is part of A'; and
(i.3) nitro (—NO$_2$) which is attached to a carbon which is part of A', and amine oxide (≡N→O), where ≡ represents three single bonds and the nitrogen is part of A';
(ii) halos which are bound to a carbon in A', such as fluoro, chloro, bromo or iodo with preference for fluoro; and
(iii) sp- and sp$^2$-hybridised carbons directly attached to a carbon atom of the sane kind which is present in A'.
sp$^2$-hybridised carbons (iii above) are typically part of an aromatic ring. A carbonyl group (—CO—) may be part of a keto, an ester or an amido group.

The atom closest to X is a carbon atom, such as an sp$^3$-hybridised or an sp$^2$-hybridised carbon. An sp$^3$-hybridised carbon at this position typically binds a hydrogen and/or one or two carbons in addition to the bond to the cation-exchange group. The remaining bond may be attached to a heteroatom or to an additional carbon, for instance as part of an HB group. An sp$^2$-hybridised carbon at this position may be part of an aromatic ring or a carbon-carbon double bond.

There may be one or more hydrogen-bonding atoms in A' between X and HB. Valuablecation-exchange ligands can thus be found in case A' provides an amide group as defined above between X and HB. An amide group at this position may be replaced with a ethylene group, ether group, thioether group etc or any other group that has a hydrolytic stability that is comparable to or higher than the amide group.

With respect to HB and the appropriate selection and location of hydrogen-bonding atoms, rules that are analogous to the rules for A' apply.

Consequently, HB may comprise at least a part of an aromatic ring which is located at a distance of 1–7 atoms from X. Aromatic rings may be homoaromatic or heteroaromatic, preferably containing a sulphur atom, such as in thiophene, or nitrogen, such as in pyridine, or oxygen, such as in furan.

HB may thus also provide, at a distance of 1–7 atoms from X, at least a part of a group selected among ether oxygen (—O—), thioether sulphur (—S—), amide (—COHN—, —N(OCR)—, —CONH$_2$, —SO$_2$NH—, —N(SO$_2$R)—, —SO$_2$NH$_2$), hydroxy, halo, and an heteroatom in an aromatic ring (oxygen, nitrogen or sulphur). The halo group is preferably fluoro, such as in trifluoromethyl.

In a second part of the first aspect of the invention, the cation-exchanger used in the method has a plurality of cation exchanging ligands, each of which complies with the general formula

where
(a) X" is a cation-exchange group selected among sulphonate (—SO$_3^-$/—SO$_3$H), sulphate (—OSO$_3^-$/—OSO$_3$H), carboxylate (—COO$^-$/—COOH), phosphate (—OPO$_3^{2-}$/—OPO$_3$H$^-$/—OPO$_3$H$_2$ or phosphonate (—PO$_3^{2-}$/—PO$_3^-$H/—PO$_3$H$_2$), and
(b) D is an organic group comprising an organic chain D' linking X" to the support matrix, said organic chain D' comprising a thioether which is located at a distance of 1–7 atoms, preferably 1–5 atoms, from the cation-exchange group (X") and the carbons in D' being non-aromatic.

In this part of the invention, D may or may not contain HB groups and/or hydrogen-bonding atoms other than thioether sulphur in D' as defined for the first part of the first aspect of the invention.

The hydrogen-bonding atom discussed above for branched and unbranched cation-exchange ligands may be located at a distance of 7, 6, 5, 4, 3, 2 and 1 atoms from the cation-exchange group (X, X', X" etc)

The Spacer

The A group (and A' chain) and the D group (and D' chain) will contain the spacer, if present. In line with what has been discussed above, the spacer starts at the support matrix and ends at a distance of at 1–8 atoms, such as 7, 6, 5, 4, 3, 2 atoms, from X (see the experimental part).

Typically the spacer comprises a straight, branched or cyclic bivalent hydrocarbon group. The carbon chain may be interrupted at one or more locations by an ether oxygen or some other group, such as thioether and amide, that can withstand the conditions a cation-exchanger may be subjected to during a process cycle (hydrolytic conditions typically being the most harmful ones). The demand for hydrolytic stability means that in many preferred spacers there are at most one atom selected from oxygen and sulphur bound to one and the same carbon atom.

The carbon atoms in the spacer may also be substituted at one or more locations by an hydroxy, lower alkoxy, lower acylamido etc. By lower alkoxy and lower acylamido is primarily intended $C_{1-6}$ groups although larger groups may be envisaged if they contain hydrophilic substituents.

The spacer may be introduced according to conventional covalent coupling methodologies including also techniques to be developed in the future. Illustrative coupling chemistries involve epichlorohydrin, epibromohydrin, allyl-glycidylether, bis-epoxides such as butanedioldiglycidylether, halogen-substituted aliphatic compounds such as di-chloro-propanol, divinyl sulfone, carbonyldiimidazole, aldehydes such as glutaric dialdehyde, quinones, cyanogen bromide, periodates such as sodium-meta periodate, carbodiimides, chloro-triazines, sulfonyl chlorides such as tosyl chlorides and tresyl chlorides, N-hydroxy succinimides, oxazolones, maleimides, 2-fluoro-1-methylpyridinium toluene-4-sulfonates, pyridyl disulfides and hydrazides.

Stability of the Novel Cation-Exchangers

The inventive cation echangers/cation-exchange ligands should resist the conditions typically applied in processes comprising cation-exchange absorptions. As a general rule of thumb this means that a cation-exchanger according to the invention should be able to resist 0.1 or 1 M NaOH in water for at least 10 hours with essentially no reduction in total ion binding capacity. By "essentially no reduction in total ion binding capacity" is contemplated that the total ion binding capacity is reduced at most 10%. In structural terms this means that the cation-exchange ligand in addition to the cation-exchange groups (X) defined above, only should contain structures selected among pure hydrocarbyls (including homoaromatic and heteroaromatic structures), thioether and ether groups, disulphide groups, hydroxy groups, sulphoxide or sulphone groups, carbox amide groups, sulphone amide groups, acetal and ketal groups and groups of similar hydrolytic stability.

The Support Matrix

The support matrix can be based on organic or inorganic material. It is preferably hydrophilic and in the form of a polymer, which is insoluble and more or less swellable in water. Hydrophobic polymers that have been derivatized to become hydrophilic are included in this definition. Suitable polymers are polyhydroxy polymers, e.g. based on polysaccharides, such as agarose, dextran, cellulose, starch, pullulan, etc. and completely synthetic polymers, such as polyacrylic amide, polymethacrylic amide, poly(hydroxyalkylvinyl ethers), poly(hydroxyalkylacrylates) and polymethacrylates (e.g. polyglycidylmethacrylate), polyvinylalcohols and polymers based on styrenes and divinylbenzenes, and co-polymers in which two or more of the monomers corresponding to the above-mentioned polymers are included. Polymers, which are soluble in water, may be derivatized to become insoluble, e.g. by cross-linking and by coupling to an insoluble body via adsorption or covalent binding. Hydrophilic groups can be introduced on hydrophobic polymers (e.g. on co-polymers of monovinyl and divinylbenzenes) by polymerization of monomers exhibiting groups which can be converted to OH, or by hydrophilization of the final polymer, e.g. by adsorption of suitable compounds, such as hydrophilic polymers.

Suitable inorganic materials to be used in support matrices are silica, zirconium oxide, graphite, tantalum oxide etc.

Preferred support matrices lack groups that are unstable towards hyrolysis, such as silan, ester, amide groups and groups present in silica as such.

The support matrix may be porous or non-porous. This means that the matrix may be fully or partially permeable (porous) or completely impermeable to the substance to be removed (non-porous).

In a particularly interesting embodiment of the present invention, the matrix is in the form of irregular or spherical particles with sizes in the range of 1–1000 µm, preferably 5–50 µm for high performance applications and 50–300 µm for preparative purposes.

An interesting form of support matrices has densities higher or lower than the liquid. These kinds of matrices are especially applicable in large-scale operations for fluidised or expanded bed chromatography as well as for different batch-wise procedures, e.g. in stirred tanks. Fluidised and expanded bed procedures are described in WO 9218237 and WO 92/00799. The most practical use of these matrices has been to combine particles/beads with a density higher than the density of a fluidising liquid with an upward flow. This kind of support matrix in expanded bed mode is particularly beneficial to combine with the inventive cation-exchange ligands in case aqueous liquid (I) contains particulate and/or sticky material.

The term hydrophilic support matrix in practice means that the accessible surface of the matrix is hydrophilic in the sense that it is penetrated by aqueous liquids. Typically the accessible surfaces on a hydrophilic base matrix expose a plurality of polar groups for instance comprising oxygen and/or nitrogen atoms. Examples of such polar groups are hydroxyl, amino, carboxy, ester, ether of lower alkyls (such as ($—CH_2CH_2O—$)$_n$H where n is an integer 2, 3, 4 and higher).

A hydrophilic coat on interior and/or outer surfaces of a matrix belongs conceptually to the support matrix. This coat maybe in form extenders, for instance as described in WO 9833572 (Amersham Pharmacia Biotech AB).

The support matrix can bead form with the cation exchange ligand defined herein being located to a surface layer or an inner layer/inner part as described in (WO 9839364 (Amersham Pharmacia Biotech AB) and WO 9839094 (Amersham Pharmacia Biotech AB) which hereby are incorporated by reference in their entirety. Accordingly such beads may have (a) an outer layer, which lacks a cation-exchange ligand as defined herein or has some other kind of ligand, and (b) an inner part/interior carrying the new inventive ligands (or vice versa).

The level of cation-exchange ligands in the cation-exchangers used in the inventive method is usually selected in the interval of 0.001–4 mmol/ml matrix, such as 0.002–0.5 mmol/ml matrix, with preference for 0.005–0.3 mmol/ml matrix. Possible and preferred ranges are, among others, determined by the kind of matrix, ligand, substance to be removed etc. Thus, the level of cation-exchange ligands is usually within the range of 0.01–0.3 for agarose-based matrices. For dextran-based matrices, the interval is typically 0.01–0.6 mmol/ml matrix.

The ranges given in the preceding paragraph refers to the capacity for the matrix in fully charged form to bind sodium ions.

Adsorption/Desorption

An adsorption and/or a desorption process may be carried out as a batch procedure, i.e. with a matrix in particulate form more or less completely dispersed in a liquid. Alternatively the processes may be run as a chromatographic procedure with the cation-exchange matrix in a monolithic form or as particles in the form of a packed or a fluidised bed and with a liquid I or a desorption liquid (liquid III) passing through under plug flow conditions.

Adsorption

During adsorption a liquid sample containing the positively charged substance is contacted with the cation-exchanger (defined above) under conditions leading to binding of the substance to the ligand via cation-exchange (cation-exchange conditions). The pH is selected such that the substance is, at least partially, positively charged and at least a part of the cation-exchange ligands are negatively charged (see above). In the preferred variants, weak cation-exchangers (for instance X=—COO$^-$) are used with pH of the liquid buffered to pKa±2, such as ±1, pH-units. The pKa-value of the cation-exchanger is taken as the inflection point when the cation-exchanger is titrated with NaOH. The ionic strength (measured as salt concentration or conductivity) is typically below the elution ionic strength for the particular combination of cation-exchanger, substance to be bound, temperature and pH, solvent composition etc. One of the benefits of the invention is that by using the bimodal anion exchangers defined above, it will be possible to run adsorption/binding also at elevated ionic strengths compared to what normally has been done for conventional cation-exchangers, for instance the reference sulphopropyl cation-exchanger discussed above. By matching the cation-exchanger to the substance to be removed, the adsorption may be carried out at an ionic strength that is higher than when using the reference ion exchanger (measured at the same pH and otherwise the same conditions). Depending on the cation-exchanger breakthrough capacities ≧200%, such as ≧300% or ≧500% and even ≧1000% of the breakthrough capacity obtained with the reference cation-exchanger may be accomplished (the same conditions as discussed before).

The exact ionic strength to be used during binding will depend on the ligand used, its density on the matrix, the substance to be bound and its concentration etc. Useful ionic strengths often correspond to NaCl concentrations (pure water) ≧0.1 M, such as ≧0.3 M or even ≧0.5 M.

Desorption

Desorption may be carried out according to established procedures in the field. Preferably the desorption process comprises at least one of the following conditions:

(A) Increasing the salt concentration (ionic strength) above the minimum elution ionic strength required for desorption, (B) Decreasing pH in order to lower the negative charge of the ligands, (C) Increasing pH for decreasing the positive charge on the substance, (D) Including a ligand analogue or an agent (e.g. a solvent additive) that reduces the polarity of the aqueous liquids used, The changes are relative to the aqueous liquid containing the substance (aqueous liquid I above).

Desorption may take place under cation-exchange conditions which means that (a) the liquid (III) used for desorption provides conditions (for instance pH) such that at least a portion of the substance to be desorbed is positively charged, and (b) the ionic strength is set to a value above the minimum elution ionic strength for these conditions.

For amphoteric compounds, options (a) implies that pH≧pI such as pH≧pI+0.5.

Desorption may also be carried out during conditions (for instance pH) at which the substance to be desorbed has net charge of zero or less and/or essentially all of the cation-exchange ligands are decharged.

In most instances, it is impossible and not necessary to change the pH such that the cation-exchange ligands become fully decharged, or the substance of interest to have a net negative charge, as described in WO 9600735 and WO 9609116 (Burton et al).

The conditions provided by (A)–(D) may be used in combination or alone. In the simplest cases this means (a) an increase in ionic strength and/or (b) a decrease in pH for reducing the positive charge of the compound to be desorbed, when changing from the adsorption liquid (I) to the desorption liquid (III). Alternative (a) includes a decreased, a constant or an increased pH during the desorption step. Alternative (b) includes a decreased, an increased or a constant ionic strength.

In chromatographic and/or batch procedures the matrix with the substance to be desorbed is present in a column or other suitable vessel in contact with the adsorption liquid (aqueous liquid I). The conditions provided by the liquid is then changed as described above until the desired substance is released and eluted from the matrix. For desorption processes carried out under cation-exchange conditions the ionic strength typically is increased compared to the adsorption and corresponds often to at least 0.6 M NaCl. The actual values depend on the various factors discussed above.

The requirement for using an increased ionic strength for desorption may be less stringent depending on the other conditions provided by aqueous liquid III (see below).

The change in conditions discussed above can be accomplished in one or more steps (step-wise gradient) or continuously (continuous gradient). The various variables of the liquid in contact with the matrix may be changed one by one or in combination.

Typical salts to be used for changing the ionic strength are selected among soluble ammonium or metal salts of phosphates, sulphates, etc, in particular alkali metal and/or alkaline earth metal salts. The same salts can also be used in the adsorption steps, but then often in lower concentrations.

Typical buffer components to be used in the inventive method are preferably selected among acid/base pairs in which the base part is anionic. Illustrative examples are carboxylic acids/carboxylates (e.g. acetic acid/acetate), phosphates etc. An increase in pH in the desorption step or earlier will reduce the positive charge of the substance to be desorbed, assist desorption and thus also reduce the ionic strength needed for release of the substance from the matrix. Depending on the pKa of the ligand used and the pI of the substance, a decrease in pH may lead to the release or binding of the substance from/to the cation-exchange matrix.

Desorption may also be assisted by adjusting the polarity of the desorption liquid (III) (compared to adsorption liquid (I)). This may be accomplished by including a water-miscible and/or less hydrophilic organic solvent in the desorption liquid (III). Examples of such solvents are acetone, methanol, ethanol, propanols, butanols, dimethyl sulfoxide, dimethyl formamide, acrylonitrile etc. A decrease in polarity of the desorption liquid (III) (compared to aqueous liquid I) is likely to assist in desorption and thus also reduce the ionic strength needed for release of the compound from the matrix.

Desorption may also be assisted by including a soluble structure analogue (ligand analogue) of the cation-exchange ligand in the desorption liquid (III). The sufficient concentration of such an analogue is at least larger than its concentration in adsorption liquid (I).

Recovery

In a subaspect the present inventive method enables high recoveries of an adsorbed substance, for instance recoveries above 60% such as above 80% or above 90%. Recovery is the amount of the desorbed substance compared to the amount of the substance applied to a cation-exchanger in the adsorption/binding step. In many instances, the recovery can exceed even 95% or be essentially quantitative. This is accomplished by adjusting the amount of the substance to be applied to the cation-exchangers to be below the total binding capacity of the cation-exchanger for the substance. Typically the amount of the substance applied to a cation-exchanger is in the interval of 10–80%, such as 20–60%, of the total capacity. Desorption is carried out according to established procedures in the field, for instance as outlined above. In many instances, desorption needs to be assisted by other means than an increase in ionic strength, for instance by a change in pH in order to decrease the positive charge of the substance or decrease the negative charge of the cation-exchange ligand.

The Second Aspect of the Invention

This aspect comprises a cation-exchanger (1) comprising a plurality of cation-exchange ligands attached to a support matrix. The ligands contain a cation-exchange group selected among sulphonate ($-SO_3^-/-SO_3H$), sulphate ($-OSO_3^-/-OSO_3H$), carboxylate ($-COO^-/-COOH$), phosphate ($-OPO_3^{2-}/-OPO_3H^-/-OPO_3H_2$ and phosphonate ($-PO_3^{2-}/-PO_3^-H/-PO_3H_2$). The characteristic feature is that the cation-exchanger (1) has a breakthrough capacity for at least one of the reference proteins human serum albumin, lysozym and IgG which is $\geq 200\%$, such as $\geq 300\%$ or $\geq 500\%$ or $\geq 1000\%$ of the corresponding breakthrough capacity obtained for a sulphopropyl cation-exchanger (cation-exchanger 2). The same support matrix, degree of substitution, counterion etc are essentially the same in the same sense as discussed above. The running conditions for determining breakthrough capacities of cation-exchanger (1) and cation-exchanger (2) are essentially the same as discussed elsewhere in this text.

In this aspect cation-exchangers in which each of the cation-exchange groups are bound to a support matrix via a non-substituted straight chain of carbon atoms interrupted at only one position by a thioether sulphur are excluded.

The Third Aspect of the Invention

This aspect relates to a novel anion exchanger, characterized in comprising a plurality of branched cation-exchange ligands, each of which is bimodal. Thus each individual ligand of this type comprises two kinds of branches as discussed above (one branch containing a cation-exchange group and another branch containing a hydrogen-binding atom at a distance of 1–7 atoms from the cation-exchange group, or shorter.

The cation-exchangers of this aspect will comprise also cation-exchangers not having the above-discussed unusually high breakthrough capacity. Such "low" capacity cation-exchange ligands are likely to be valuable due to the fact that their bimodality is likely to impose new selectivities and/or specificities relative to various target substances one may desire to remove from liquids.

The Fourth Aspect of the Invention

This aspect comprises the use of the cation-exchangers of the second and third aspect in a method for removing a positively charged substance from an aqueous liquid (I) containing said substance in dissolved form. The method comprises (i) contacting the liquid (I) with a cation-exchanger (1) under cation-exchange conditions leading to binding of the substance to the ligand, and (ii) possibly followed by a subsequent desorption of said substance.

The various structural features/variables and running conditions are the same as for the method of the first aspect.

The Fifth Aspect of the Invention.

This aspect is a method for testing (screening) the appropriateness of one or more cation-exchangers for removing a substance from a liquid, said method comprising the steps:

(a) providing a library which comprises
  (i) one or more cation-exchangers to be tested (exchangers 1, 2, 3, 4 . . . n; n=an integer>0) each of which cation-exchangers differs with respect to kind of ligand (ligands 1, 2, 3, 4 . . . n), and
  (ii) a reference cation-exchanger having a reference ligand, the support matrix, the substitution degree, counterion etc being essentially the same in the exchangers 1, 2, 3, 4 . . . n and in the reference cation-exchanger;

(b) determining the breakthrough capacity of exchanger 1 for the substance at predetermined conditions;

(c) determining the breakthrough capacity of the reference cation-exchanger for the substance at the same conditions as in step (b);

(d) concluding from the relation between the breakthrough capacities obtained in steps (b) and (c), if cation-exchanger 1 is appropriate to use for removing the substance; and (e) repeating, if necessary, steps (b), (d) and (e) for at least one of the exchangers 2, 3, 4 . . . n.

In particular it is believed that in case the breakthrough capacity for the sample cation-exchanger/ligand is larger than for the reference cation-exchanger/ligand then the sample cation-exchanger/ligand will have advantages over the reference cation-exchanger/ligand. This conclusion will be more pronounced in case the breakthrough capacity for the sample cation-exchanger/ligand is $\geq 200\%$, such as $\geq 300\%$ or $\geq 500\%$ or $\geq 1000\%$ of the breakthrough capacity of the reference cation-exchanger/ligand.

This screening method is in particular adapted for screening libraries in which at least one of the cation-exchangers 1-n are defined in the first to fourth aspects of the invention.

Two or more of the cation-exchangers 1-n may be tested in the method in parallel or in sequence.

The reference cation-exchanger may have a ligand that is defined in anyone of the first to fourth aspect of the invention.

Selection of running conditions and reference cation-exchanger can be done as outlined for these other aspects of the invention. Steps (b) and (c) may be performed at an ionic strength, for instance corresponding to the ionic strength in a water solution that consists of water 0.1 M NaCl or higher, preferably $\geq 0.3$ M NaCl.

In this aspect of the invention, tabulated or predetermined breakthrough capacities for the reference cation-exchanger may be used. Thus the method also encompasses that measurements are carried out at different times and/or by different individuals or by machines, including using tabulated values from outside sources for the reference cation-exchanger or cation-exchange ligand.

A cation ligand found by this screening method can be used in an inventive manner in any of the above-mentioned method aspects.

The Substance(s) to be Removed from the Liquid (I).

The present invention is chiefly intended for large molecular weight substances that have several structural units that can interact with the used bimodal cation ligands defined above. Appropriate compounds typically have a molecular weight that is above 500 dalton, such as above 1000 dalton. Typical compounds are bio-organic and/or polymeric. The number of positively charged groups per substance molecule is typically one or more. The charge of the substance is dependent on pH in the most well-fitted cases (that is to say the substance is amphoteric). Among positively charged bio-organic substances those having polypeptide structure, lipid structure, and/or carbohydrate structure are normally possible to remove from a liquid according to the method aspects of the invention. In principle the invention is applicable also to other bio-organic and organic substances provided they meet the structural demands given above.

The substance may be a solute in the aqueous medium (dissolved therein) or in the form of small bio-particles, for instance of colloidal dimensions. Illustrative examples of bio-particles are viruses, cells (including bacteria and other unicellular organisms) and cell aggregates and parts of cells including cell organelles.

In particular it is believed that the invention will be applicable to aqueous liquids that are derived from biological fluids comprising a substance of interest together with high concentration of salts. The novel cation-exchangers are likely to be extremely useful in desalting, e.g. by enabling adsorption at high ionic strength and desorption at a lowered ionic strength by first changing the pH to reduce the positive charge of the adsorbed substance.

Typical liquids of high ionic strength and containing bio-organic substances of interest to be purified are fermentation broths/liquids, for instance from the culturing of cells, and liquids derived therefrom. The cells may originate from a vertebrate, such as a mammal, or an invertebrate (for instance cultured insect cells), or a microbe (e.g. cultured fungi, bacterial, yeast etc). Included are also plant cells and other kind of living cells, preferably cultured.

In case aqueous liquid (I) containing the substance to be removed contains particulate matter then it may be beneficial to utilize fluidised particulate support matrices carrying the novel cation-exchange ligands together with an upward flow. Aqueous liquids of this type may originate from (a) a fermentor broth/liquid from the culture of cells, (b) a liquid containing lysed cells, (c) a liquid containing cell and/or tissue homogenates, and (d) pastes obtained from cells.

The invention will now be illustrated by non-limiting experiments given in the subsequent experimental part. The invention is further defined in the appended patent claims.

EXPERIMENTAL PART

1. Synthesis of Cation-Exchangers

There are a variety of methods for immobilizing ligand-forming compounds to surfaces [Hermanson, G. T., Mallia, A. K. & Smith, P. K., (Eds.), *Immobilization Affinity Ligand Techniques*, Academic Press, INC, 1992.] of which many are applicable for our purpose. In the following, we shall describe the methods we have adopted for preparing the new series of weak cation exchangers (based on carboxylic acids) to serve as examples. As base matrix, we have used Sepharose 6 Fast Flow (Amersham Pharmacia Biotech, Uppsala, Sweden) which will be referred to as Sepharose 6 FF throughout.

1:1. Activation of Sepharose 6 FF with Allyl Glycidyl Ether:

This is performed by reacting allylglycidyl ether with Sepharose 6 FF under alkaline conditions, essentially as described in WO 97/29825 (Amersham Pharmacia Biotech AB). In a suitable reaction vessel, 80 g of Sepharose 6 FF was mixed with 0.5 g of $NaBH_4$, 13 g of $Na_2SO_4$ and 40 mL of 50% (w/w) aqueous solution of NaOH. The mixture was stirred for 1 hour at 50° C. and 100 mL of allylglycidyl ether was added. The suspension was stirred for an additional 18 h at 50° C. The mixture was filtered and the gel washed successively with 500 mL of distilled water, 500 mL ethanol, 200 mL distilled water, 200 mL 0.2 M acetic acid, and finally with 500 mL of distilled water.

Analysis by titration resulted in a degree of substitution of 0.3 mmol of allyl groups/ml gel. In the following, the allyl-derivatised Sepharose 6 FF will be referred to as Product I.

1:2. Introduction of Carboxyl Groups (Alternative 1)

This can be achieved by coupling reactive nucleophiles containing carboxyl groups (e.g. mercaptopropionic acid) to Product I. It can also be achieved by conventional carboxymethylation of Sepharose 6 FF with chloroacetic acid under alkaline conditions. The resulting product can be used as a cation-exchanger as such or serve as an intermediate for synthesizing other cation exchangers via an amide linkage. The procedure described below provides an example for coupling mercaptopropionic acid to Product I (allyl-derivatised Sepharose 6 FF)

1:2:1. Activation of Product I (Allylated-Sepharose 6 FF)

In a typical procedure, bromine water was added to a stirred suspension of 100 mL of Product I, 4 g of sodium acetate and 100 mL of distilled water, until a persistent yellow colour was obtained. Reduction of excess bromine was achieved by adding sodium formate to the suspension until the faint yellow colour disappeared. The reaction mixture was filtered and the allyl-derivatised gel washed with 500 mL of distilled water.

1:2:2. Coupling of Mercaptopropionic Acid to Activated Product I

The activated gel (Product I) was transferred to a reaction vessel followed by a mixture of 17.5 mL of mercaptopropionic acid (6 equivalents per allyl group) and 50 mL of 4 M NaCl. The pH of the mixture was adjusted to pH 11.5 with 50% (w/w) aqueous NaOH before it was added to the activated gel. The suspension was stirred for 18 hours at 50° C. and then filtered. The gel was washed with 500 mL of distilled water and its content of carboxyl groups was determined by titration. This gave a degree of substitution of about 0.29 mmol COOH group/ml of gel. This product will be referred to as Product II.

1:3. Introduction of Carboxyl Groups (Alternative 2)

This provides an alternative method for coupling ligand-forming compounds (containing both amino and carboxyl functions) to a solid support via an amide bond. The procedure involves 2 steps and is described below.

1:3:1. Activation of Mercaptopropionic Acid-Sepharose 6 FF (Product II) with N-Hydoxysuccinimide 100 mL of mercaptopropionic acid-Sepharose 6 FF (Product II) was washed successively with 300 mL 1 M NaCl, 500 mL 0.1 M HCl, 500 ml 50% aqueous acetone and 500 mL acetone. The gel was allowed to settle and the supernatant siphoned off. The gel was then quantitatively transferred to a reaction vessel followed by a solution of 15.2 g of N-hydroxysuccinimide in 80 mL of acetone and another solution of 29.9 g of dicyclohexylcarbodiimide in 80 mL of acetone. The slurry was stirred for 18 hours at 30°. The mixture was filtered and the gel washed (by gravity flow) with 10 portions of 150 mL isopropanol during a period of about 8 hours.

The extent of activation of Product II was approximately 75%, as estimated by reaction with $NH_4OH$. The product obtained here (i.e. NHS-activated mercaptopropionic acid-Sepharose 6 FF) will be referred to as Product III.

1:3:2. Coupling of Thienyl Serine to Product III

The procedure outlined here provides an example of a general method for coupling ligand-forming compounds via an amide linkage. A solution of thienyl serine (2 g in 8 mL of distilled water) was mixed with 8 mL of 1M $NaHCO_3$ and 10 mL of ethanol and the pH adjusted to pH 8.5 by careful addition of 50% aqueous NaOH. 25 mL of Product III (NHS-activated mercaptopropionic acid-Sepharose 6 FF) was washed quickly with 50 mL of ice-cold 1 mM solution of HCl on a sintered glass funnel. The gel was then transferred to an Erlenmeyer flask and the solution of thienyl serine was added to it. The reaction mixture was then shaken at moderate speed for 18 h at room temperature The reaction mixture was filtered and the gel washed sequentially with 100 mL distilled water, 50 mL ethanol, 50 mL 0.25 M aqueous ethanolamine, 50 mL distilled water, 50 mL 1M NaCl, and finally with 50 mL of distilled water.

The efficiency of coupling of thienyl serine was determined to be about 70% by elementary sulphur analysis which corresponds to a degree of substitution of 0.15 mmol of thienyl serine per mL of gel. Most of the "high salt" cation-exchangers were prepared by this method.

2. Chromatography

In this investigation, 3 purified proteins [representing basic (lysozyme=Lys), neutral to weakly basic (IgG) and acidic (BSA)] were used to characterise the new series of "high salt" cation exchangers with respect to 2 important parameters, viz. breakthrough capacity ($Qb_{10\%}$) and recovery of proteins applied to them. The binding and elution of lysozyme was done under normal operating procedures, i.e. adsorption at neutral pH and elution with buffer containing high salt (e.g. 2 M NaCl) at the same pH. IgG was bound at pH 4.5 and eluted with buffer of pH 7.0 containing relatively low salt concentration (0.1 M). IgG was bound at low pH because a significantly higher amount could be adsorbed to the various media. BSA was bound at pH 4.0 where it is positively charged (pI of BSA=4.9) and eluted by raising the pH to 7.0, as in the case of IgG. The procedure used for binding BSA at pH 4.0 can be considered "reverse operating procedure" and is widely adopted for the removal of negatively-charged pigments and other impurities from recombinant proteins, e.g. HSA produced in yeast (e.g. EP 0 570 916 A2 & EP 0 699 687 A2). Such low molecular weight impurities are otherwise difficult to separate from HSA under physiological pH because they are negatively charged just as HSA. The procedures used to determine breakthrough capacities for the new series of "high salt" ligands, and the recovery of proteins bound to them, are outlined below.

A. Breakthrough Capacity ($Qb_{10\%}$) at "High Salt" Conditions

One of the main criteria for designating a cation-exchange ligand as a "high salt" ligand is its binding capacity for proteins in the presence of relatively high concentrations of salt (e.g. 0.3 M NaCl) relative to a reference ion exchanger that is operated under identical conditions. This is determined using the method of frontal analysis as described below.

Experimental

I. Buffer Solutions

Buffer 1: 20 mM sodium phosphate, 0.3 M NaCl, pH 6.8
Buffer 2: 20 mM sodium acetate, 0.25 M NaCl, pH 4.0
Buffer 3: 20 mM sodium acetate, 0.25 M NaCl, pH 4.5
Buffer 4. 20 mM sodium phosphate, 2 M NaCl, pH 6.8 (for elution of lysozyme)
Buffer 5: 100 mM sodium phosphate, pH 7.0 (for elution of BSA and IgG)

II. Protein Solutions

1. Lysozyme: 4 mg/mL in Buffer 1
2. BSA: 4 mg/mL in Buffer 2
3. IgG: 4 mg/mL in Buffer 3

All buffers and protein solutions were filtered through a 0.45 μm Millipore Millex HA filters before use.

III. Chromatography System

All experiments were performed at room temperature using a Äkta Explorer 100 chromatography system equipped with a Unicorn 3.1 software. Samples were applied to the columns via a 150 mL superloop. A flow rate of 1 mL/min (ca. 300 cm/h) was used throughout. The effluents were monitored continuously by absorbance measurements at 280 nm using a 10 mm flow cell.

IV Frontal Analysis

Each prototype cation-exchanger was packed in a HR5/5 column (packed bed volume=1 mL) and equilibrated with a buffer of appropriate pH and salt concentration. The void volume of the system was determined by applying a solution of a suitable protein to the column under non-binding conditions. The time it takes for the $A_{280}$ of the effluent to reach 10% of the $A_{280}$ of the applied protein is taken as the void volume of the system (expressed in minutes).

To a column equilibrated with an appropriate buffer (Buffer 1, 2 or 3) was continuously fed (e.g. via a 150 mL super loop) the sample protein dissolved in the appropriate equilibration buffer (see above) at a flow rate of 1 mL/min (i.e. ca. 300 cm/h). The application of the sample was continued until the $A_{280}$ of the effluent reached a level of 10% of the $A_{280}$ the sample applied to the column. On the basis of data so obtained [i.e. volume of the packed gel bed (Vc), its void volume, flow rate and concentration of the protein fed to the column], the breakthrough capacity of the packed gel at a level of 10% of the concentration of the protein applied to it ($QB_{10\%}$) can be calculated. The results so obtained have formed the basis for screening a large number of "high salt ligand" candidates and will be presented below for 3 proteins, viz. lysozyme, bovine serum albumin (BSA) and human immunoglobulin (IgG).

V. Evaluation

The breakthrough at a level of 10% of the absorbance maximum ($Qb_{10\%}$) was calculated using the following relationship:

$$Qb_{10\%} = (T_{R10\%} - T_{RD}) \times C/V_c$$

where:
$T_{R10\%}$=retention time (min) at 10% of the absorbance maximum,
$T_{RD}$=void volume of the system (in min),
C=concentration of the feed protein (4 mg/mL) and,
$V_C$=packed bed volume (mL).of the column.

B. Recovery of Proteins Bound to "High Salt" Cation-Exchange Ligands

The "high salt" cation exchange ligands are also screened with respect to the recovery of proteins bound on them. This is an additional and important criterion for choosing the right kinds of ligands that combine relatively high adsorption capacities with high or quantitative recoveries of proteins applied to them. The recovery was determined as outlined below.

Experimental

Details concerning type of column, packed bed volume, buffers, protein solutions, flow rate and type of apparatus used are outlined under sections 2A:i and 2A:ii. For lysozyme, the column was equilibrated with Buffer 1 and the bound protein eluted with Buffer 4. For BSA, the column was equilibrated with Buffer 2 and the bound protein eluted with Buffer 5; for IgG, the column was equilibrated with Buffer 3 and the bound protein eluted with Buffer 5.

To a column equilibrated with the appropriate buffer (Buffer 1, 2 or 3) was applied a solution of the protein (Lysozyme (=Lys), BSA or IgG) from a 50 mL super loop until an amount corresponding to 30% of its breakthrough capacity was applied. The column was then washed with 2 bed volumes of the equilibration buffer and the bound protein was eluted with the appropriate de-sorption buffer (Buffer 4 or 5). The eluted protein is collected quantitatively in a 20 mL volumetric flask and its volume and absorbance at 280 nm (for BSA and IgG) or at 254 nm (for lysozyme) were measured accurately. On the basis of the total absorbance in each eluted sample, the amount of protein in the eluates was calculated using an appropriate calibration curve (see below).

Evaluation

Standard solutions for each protein were prepared covering the concentration range of 0–10 mg/mL in the column equilibration buffer. The $A_{280}$ (BSA & IgG) or $A_{254}$ (Lysozyme) of the series of dilutions were measured and a calibration curve was prepared with the protein concentration (mg/mL) on the x-axis and the absorbance on the y-axis. The linear equations and regression coefficients of each of the calibration curves were calculated. On the basis of these standard curves, the concentration (in mg/mL) of protein in the eluted sample was calculated by measuring the $A_{280}$ or $A_{254}$ of said sample using the following relationship:

$$C_S = \frac{A}{\varepsilon \cdot b}$$

where:
$C_S$=concentration of protein in the eluted sample (mg/mL)
A=absorbance (at $A_{280}$ or $A_{254}$ nm)
$\varepsilon$=molar absorption coefficient at a specific wavelength ($M^{-1}$ $cm^{-1}$)
b=cell path length (cm)

The recovery of the bound protein is then calculated using the following relationship:

$$\text{Recovery, \%} = \frac{C_S \cdot V_S}{C_L \cdot V_L}$$

Where:
$V_S$=volume of the eluted protein sample (mL)
$C_L$=concentration of the applied sample (mg/mL)
$V_L$=volume of the applied sample (mL)

RESULTS

Breakthrough Capacity at High Salt Conditions

The results obtained for breakthrough capacities and recoveries for a series of representative "high salt" cation exchange ligands are summarised in Table 1. The examples shown in Table 1 illustrate some specific properties of the various ligands and should not be interpreted as limitations on the scope of this invention. The degree of ligand substitution on the majority of these new cation exchangers was ca. 0.18–0.20 mmol/mL packed gel. A few had as much as 0.27 mmol/mL packed gel. As a reference cation exchangers, the commercially available Sulphopropyl (or S) Sepharose 6 FF was used whose ligand concentration is in the same range as the new series of cation exchangers (i.e. 0.18–0.25 mmol/mL packed gel). The results indicate the following trends:

1. With few exceptions, the new cation exchange ligands have a much higher $Qb_{10\%}$ for all 3 proteins compared to the reference cation exchanger S Sepharose FF.
2. Ligand 1 gave the highest $Qb_{10\%}$ for Lys (60 mg/mL); ligand 10 for HSA (57 mg/mL) and ligand 12 for IgG (33 mg/mL). These values correspond to an increase of 1295%, 2092% and 4025% for Lys, HSA and IgG, respectively, on the above 3 ligands relative to the reference cation exchanger (S Sepharose 6 FF).
3. Of the 18 ligands presented below, the first 5 showed a significantly high $Qb_{10\%}$ for all 3 proteins compared to the others. This indicates that these ligands can form the basis for the construction of future "high salt" ligands.
4. Some ligands show relatively low $Qb_{10\%}$ for IgG but high $Qb_{10\%}$ values for the other 2 proteins (e.g. ligands 7, 8 and 9).
5. Ligand 11 has high values for $Qb_{10\%}$ Lys but very low values for the other 2 proteins. The reverse is true for ligands 12, 13 and 14. These results can thus serve as guidelines for the construction "specific" types of "high salt" cation exchangers in the future.
6. Ligands 15, 16, 17 and 18 have a much higher $Qb_{10\%}$ for HSA than for Lys or IgG. The results suggest that these ligands can be useful for removing HSA from IgG preparations.

Recovery of Proteins Bound to "High Salt" Cation-Exchange Ligands

The recovery data for HSA are complete while those for Lys are determined for ca. 60% of the ligands. The data for IgG are determined for only a few promising ligands. The results obtained indicate:

1. All the ligands, taken together, gave a recovery of better than 65%, irrespective of the protein used.
2. Ligand 2 was found to be the most optimal ligand in this respect resulting in a recovery for Lys, BSA and IgG of 100%, 93% and 79%, respectively.
3. The results also show that step-wise elution with pH or salt results in high yield.

STRUCTURE OF LIGANDS

Cation exchange ligands were created by reacting
(a) the ligand-forming compounds 1–14, 16 and 18 with the NHS-activated form of Product II or (b) the ligand-forming compounds 15 and 17 with the bromine activated form of Product I.

Variant (a) meant that ligand-forming compound was linked to the matrix via an amide group. Variant (b) meant linkage via a thioether.

The best ligand-forming compounds that so far has resulted in cation-exchangers with breakthrough capacities larger than 300% of the breakthrough capacity of the corresponding conventional sulphopropyl cation exchanger are given below.

Reference cation exchanger: S Sepharose FF (sulpho propyl Sepharose FF): $Qb_{10\%}$: Lys=4.3 mg/mL, BSA=2.6 mg/mL, IgG=0.8 mg/mL.

M, Z, HB and HB' as a superscript at an atom indicate that the group is bound at this atom.

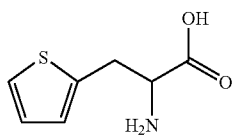

Ligand 1.
A=$^M$OCH$_2$CH(OH)CH$_2$OCH$_2$CH(OH)CH$_2$SCH$_2$CH$_2$CONHC$^{HB,Z}$H. HB=2-thienyl methyl. $Qb_{10\%}$: Lys=60 mg/mL, BSA=44 mg/mL, IgG=20 mg/mL. Recovery: Lys=100%, BSA=86%, IgG=69%

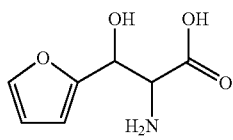

Ligand 2.
A=$^M$OCH$_2$CH(OH)CH$_2$OCH$_2$CH(OH)CH$_2$SCH$_2$CH$_2$CONHC$^{HB,Z}$H. HB=2-furanyl hydroxymethyl. $Qb_{10\%}$: Lys=38 mg/mL, BSA=42 mg/mL, IgG=27 mg/mL. Recovery: Lys=100%, BSA=93%, IgG=79%

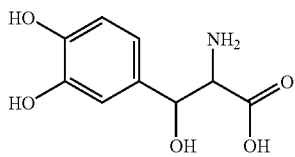

Ligand 3.
A=$^M$OCH$_2$CH(OH)CH$_2$OCH$_2$CH(OH)CH$_2$SCH$_2$CH$_2$CONHC$^{HB,Z}$H. HB=3,4-dihydroxyphenyl hydroxymethyl. $Qb_{10\%}$: Lys=43 mg/mL, BSA=44 mg/mL, IgG=24 mg/mL. Recovery: Lys=93%, BSA=91%,

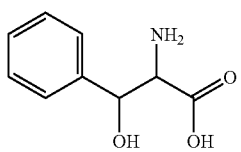

Ligand 4.
A=$^M$OCH$_2$CH(OH)CH$_2$OCH$_2$CH(OH)CH$_2$SCH$_2$CH$_2$CONHC$^{HB,Z}$H. HB=Phenyl hydroxymethyl. $Qb_{10\%}$: Lys=50 mg/mL, BSA=50 mg/mL, IgG=22 mg/mL. Recovery: Lys=97%, BSA=93%, IgG=75%

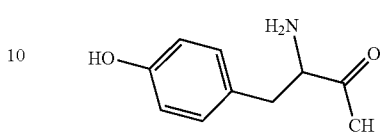

Ligand 5.
A=$^M$OCH$_2$CH(OH)CH$_2$OCH$_2$CH(OH)CH$_2$SCH$_2$CH$_2$CONHC$^{HB,Z}$H. HB=4-hydroxyphenyl methyl. $Qb_{10\%}$: Lys=32 mg/mL, BSA=40 mg/mL, IgG=23 mg/mL. Recovery: Lys=81%, BSA=93%, IgG=76%

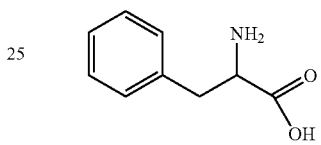

Ligand 6.
A=$^M$OCH$_2$CH(OH)CH$_2$OCH$_2$CH(OH)CH$_2$SCH$_2$CH$_2$CONHC$^{HB,Z}$H. HB=hydroxyphenyl methyl. $Qb_{10\%}$: Lys=50 mg/mL, BSA=44 mg/mL, IgG=14 mg/mL. Recovery: Lys=91%, BSA=79%, IgG=66%

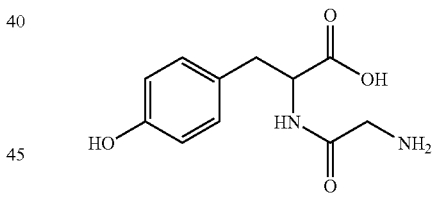

Ligand 7.
A=$^M$OCH$_2$CH(OH)CH$_2$OCH$_2$CH(OH)CH$_2$SCH$_2$CH$_2$CONHCH$_2$CONHC$^{HB,Z}$H. HB=4-hydroxyphenyl methyl. $Qb_{10\%}$: Lys=62 mg/mL, BSA=44 mg/mL, IgG=11 mg/mL. Recovery: Lys=93%, BSA=93%, IgG=65%

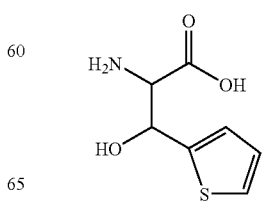

Ligand 8.

A=$^M$OCH$_2$CH(OH)CH$_2$OCH$_2$CH(OH)CH$_2$SCH$_2$CH$_2$CONHC$^{HB,Z}$H. HB=2-thienyl hydroxymethyl. Qb$_{10\%}$: Lys=51 mg/mL, BSA=45 mg/mL, IgG=5 mg/mL, Recovery Lys=90%, BSA=92%

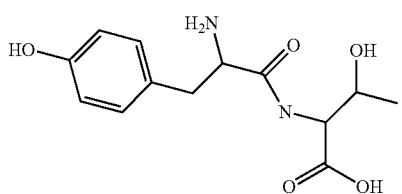

Ligand 9.

A=$^M$OCH$_2$CH(OH)CH$_2$OCH$_2$CH(OH)CH$_2$SCH$_2$CH$_2$CONHC$^{HB'}$HCONHC$^{HB,Z}$H. HB=1-hydroxy ethyl, HB'=4-hydroxyphenyl methyl. Qb$_{10\%}$: Lys=46 mg/mL, BSA=49 mg/mL, IgG=6 mg/mL. Recovery: Lys=94%, BSA=92%

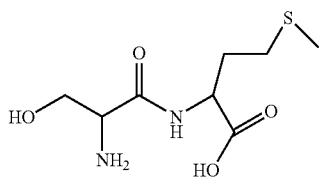

Ligand 10.

A=$^M$OCH$_2$CH(OH)CH$_2$OCH$_2$CH(OH)CH$_2$SCH$_2$CH$_2$CONHC$^{HB'}$HCONHC$^{HB,Z}$H. HB=2-thiomethoxy ethyl, HB'=hydroxy methyl. Qb$_{10\%}$: Lys=20 mg/mL, BSA=57 mg/mL, IgG=10 mg/mL. Recovery: Lys=78%, BSA=93%, IgG=68%

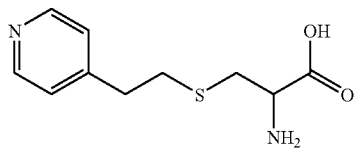

Ligand 11.

A=$^M$OCH$_2$CH(OH)CH$_2$OCH$_2$CH(OH)CH$_2$SCH$_2$CH$_2$CONHC$^{HB,Z}$H. HB=(4-pyridyl)CH$_2$CH$_2$SCH$_2$—. Qb$_{10\%}$: Lys=50 mg/mL, BSA=2 mg/mL, IgG=4 mg/mL. Recovery: Lys=78%, Recovery BSA=93%

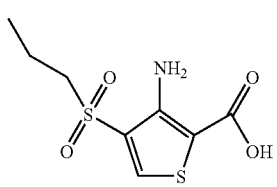

Ligand 12.

A=$^M$OCH$_2$CH(OH)CH$_2$OCH$_2$CH(OH)CH$_2$SCH$_2$CH$_2$CONH(thienyl)$^{HB,Z}$. HB=3-CH$_3$CH$_2$CH$_2$SO$_2$—. Qb$_{10\%}$: Lys=5 mg/mL, BSA=50 mg/mL, IgG=33 mg/mL. Recovery: BSA=82%, IgG=88%

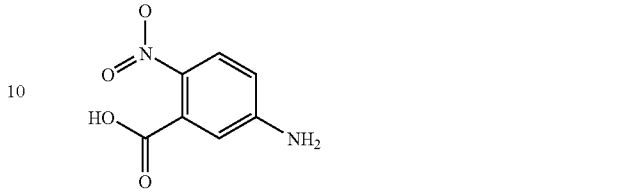

Ligand 13.

A=$^M$OCH$_2$CH(OH)CH$_2$OCH$_2$CH(OH)CH$_2$SCH$_2$CH$_2$CONH(phenyl)$^{HB,Z}$. HB=2-nitro-. Qb$_{10\%}$: Lys=5 mg/mL, BSA=41 mg/mL, IgG=27 mg/mL. Recovery: BSA=93%

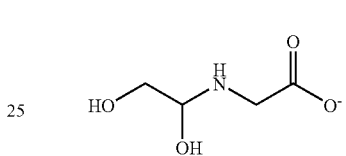

Ligand 14.

A=$^M$OCH$_2$CH(OH)CH$_2$OCH$_2$CH(OH)CH$_2$SCH$_2$CH$_2$CON$^{HB}$C$^Z$H$_2$. HB=1,2-dihydroxy ethyl. Qb$_{10\%}$: Lys=4 mg/mL, BSA=38 mg/mL, IgG=23 mg/mL. Recovery: BSA=93%, IgG=86%

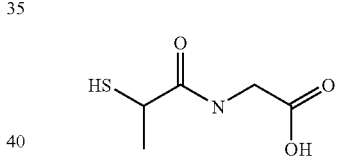

Ligand 15.

D=$^M$OCH$_2$CH(OH)CH$_2$OCH$_2$CH(OH)CH$_2$SCH(CH$_3$)CHCONHC$^Z$H$_2$. Qb$_{10\%}$: Lys=5 mg/mL, BSA=51 mg/mL, IgG=4 mg/mL. Recovery: BSA=92%.

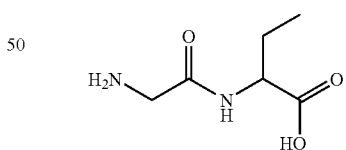

Ligand 16.

D=$^M$OCH$_2$CH(OH)CH$_2$OCH$_2$CH(OH)CH$_2$SCH$_2$CH$_2$CONHCH$_2$CONHC$^Z$H(CH$_2$CH$_3$). Qb$_{10\%}$: Lys=3 mg/mL, BSA=46 mg/mL, IgG=3 mg/mL. Recovery: BSA=87%

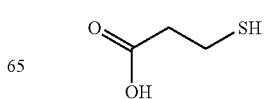

Ligand 17.
D=$^M$OCH$_2$CH(OH)CH$_2$OCH$_2$CH(OH)CH$_2$SCH$_2$C$^Z$H$_2$.
Qb$_{10\%}$: Lys=4 mg/mL, BSA=51 mg/mL, IgG=4 mg/mL.
Recovery: BSA=91%

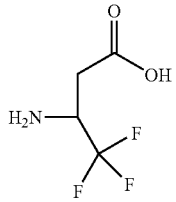

Ligand 18.
A=$^M$OCH$_2$CH(OH)CH$_2$OCH$_2$CH(OH)
CH$_2$SCH$_2$CH$_2$CONHC$^{HB}$HC$^Z$H$_2$. HB=trifluoromethyl.
Qb$_{10\%}$: Lys=7 mg/mL, BSA=37 mg/mL, IgG=7 mg/mL.
Recovery: BSA=93%

What is claimed is:

1. A method for testing the appropriateness of a cation-exchanger for removing a substance from a liquid, said method comprising the steps:
    (a) providing a library which comprises
        (i) one or more cation-exchangers to be tested (exchangers 1, 2, 3, 4 . . . n; n=an integer>0) each of which cation-exchangers differs with respect to kind of ligand (ligands 1, 2, 3, 4 . . . n), and
        (ii) one or more reference cation-exchangers having reference ligands, wherein the support matrix and the substitution degree are essentially the same in the exchangers 1, 2, 3, 4 . . . n and in the reference cation-exchanger;
    (b) determining the breakthrough capacity of exchanger 1 for the substance at predetermined conditions;
    (c) determining the breakthrough capacity of the reference cation-exchanger for the substance at the same conditions as in step (b);
    (d) concluding from the relation between the breakthrough capacities obtained in steps (b) and (c), if cation-exchanger 1 is appropriate to use for removing the substance; and
    (e) repeating steps (b), (c) and (d) for at least one of the exchangers 2, 3, 4 . . . n.

2. The method of claim 1, wherein step (e) is performed in parallel with or subsequent to steps (b), (c) and (d) for exchanger 1.

3. The method of claim 1, wherein the predetermined conditions in steps (b) and (c) include that the ionic strength is above the ionic strength of a water solution that is 0.3 M in NaCl.

4. The method of claim 1, wherein the breakthrough capacity determined for a tested cation-exchanger that is larger than the breakthrough capacity for the reference cation-exchanger is taken as an indication that the cation-exchanger or ligand is appropriate to use for removing the substance.

5. In a method for removing a positively charged substance from an aqueous liquid(I) containing said substance by contacting the liquid with a cation-exchanger(1) under conditions permitting binding of said substance to said cation-exchanger(1), optionally followed by a subsequent desorption of said substance, the improvement comprising selecting said cation-exchanger to be capable of
    (a) binding said substance by cation-exchange in an aqueous liquid reference(II) at an ionic strength corresponding to 0.3M NaCl and
    (b) permitting a break through capacity for said substance>200% of the break-through capacity of said substance for a reference cation-exchanger(2) containing sulphopropyl groups —CH$_2$CH$_2$CH$_2$SO$_2$O—,
    wherein the cation-exchanger includes a plurality of cation exchange ligands having the formula

—D—X"

where
    (c) X" is a cation-exchange group selected from the group consisting of sulphonate (—SO$_3^-$/—SO$_3$H) sulphate (—OSO$_3^-$/—OSO$_3$H), carboxylate(—COO$^-$/—COOH), phosphate(—OPO$_3^{2-}$/OPO$_3$H$^-$/—OPO$_3$ H$_2$) and phosphonate(—PO$_3^{2-}$/—PO$_3^-$H/—PO$_3$H$_2$), and
    (d) D is an organic group including an organic chain D' linking X" to the support matrix, and said organic chain D' includes a thioether sulphur at a distance of 1–7 atoms from the cation-exchange group (X') and only non-aromatic carbons,
    and wherein D' includes an amide group(—CONH—, —NHCO—, —N(OCR)—, —SO$_2$NH—, —NHSO$_2$—, —N(SO$_2$R)—), an ether, an ester, or a hydrogen-binding group projecting from D' selected from the group consisting of
    (i) oxygens in
        (i.1) —CO—, —SO— or —SO2-where the carbon and sulphur are part of D';
        (i.2) alcoholic or phenolic hydroxy that bind directly to a carbon in D';
        (i.3) nitro (—NO$_2$) which is attached to a carbon which is part of A', and amine oxide(NO), where represents three single bonds and the nitrogen is part of A'
    (ii) halogens which are bound to a carbon in D', such as fluoro, chloro, bromo or iodo with preference for fluoro; and
    (iii) sp and sp$^2$-hybridised carbons directly attached to an sp- and sp$^2$-hybridised carbon, respectively, which is part of D'.

* * * * *